May 19, 1970 — M. A. SULLIVAN — 3,513,053
PALLLET MAKING APPARATUS AND METHOD
Filed April 29, 1968 — 2 Sheets-Sheet 2
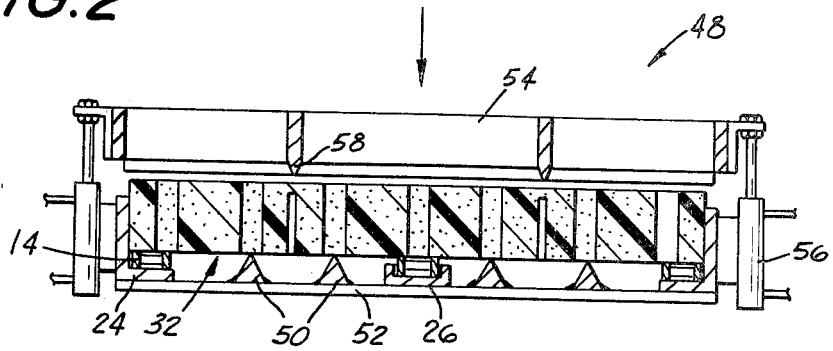
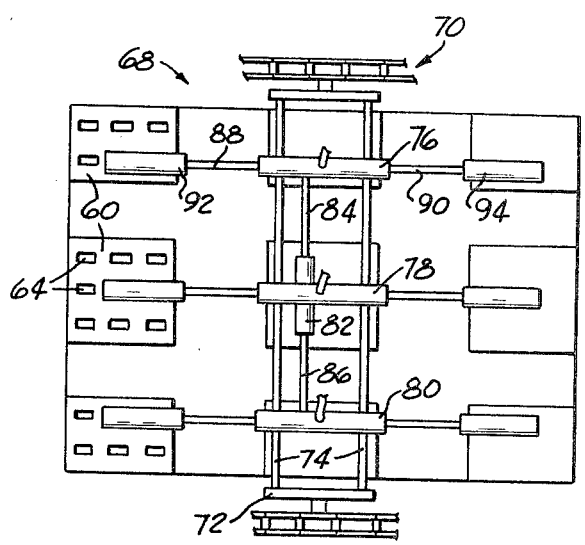
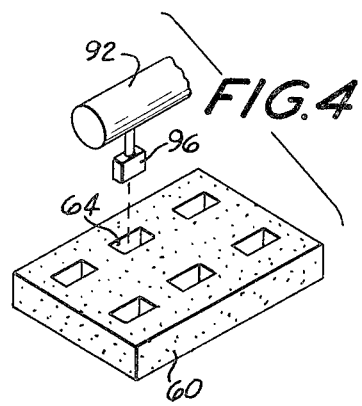
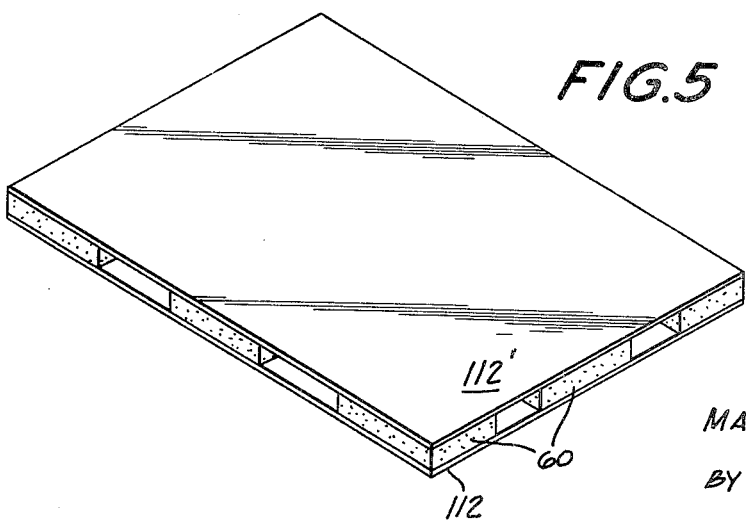
INVENTOR
MATTHEW A. SULLIVAN
BY Seidel & Gonda
ATTORNEYS

United States Patent Office 3,513,053
Patented May 19, 1970

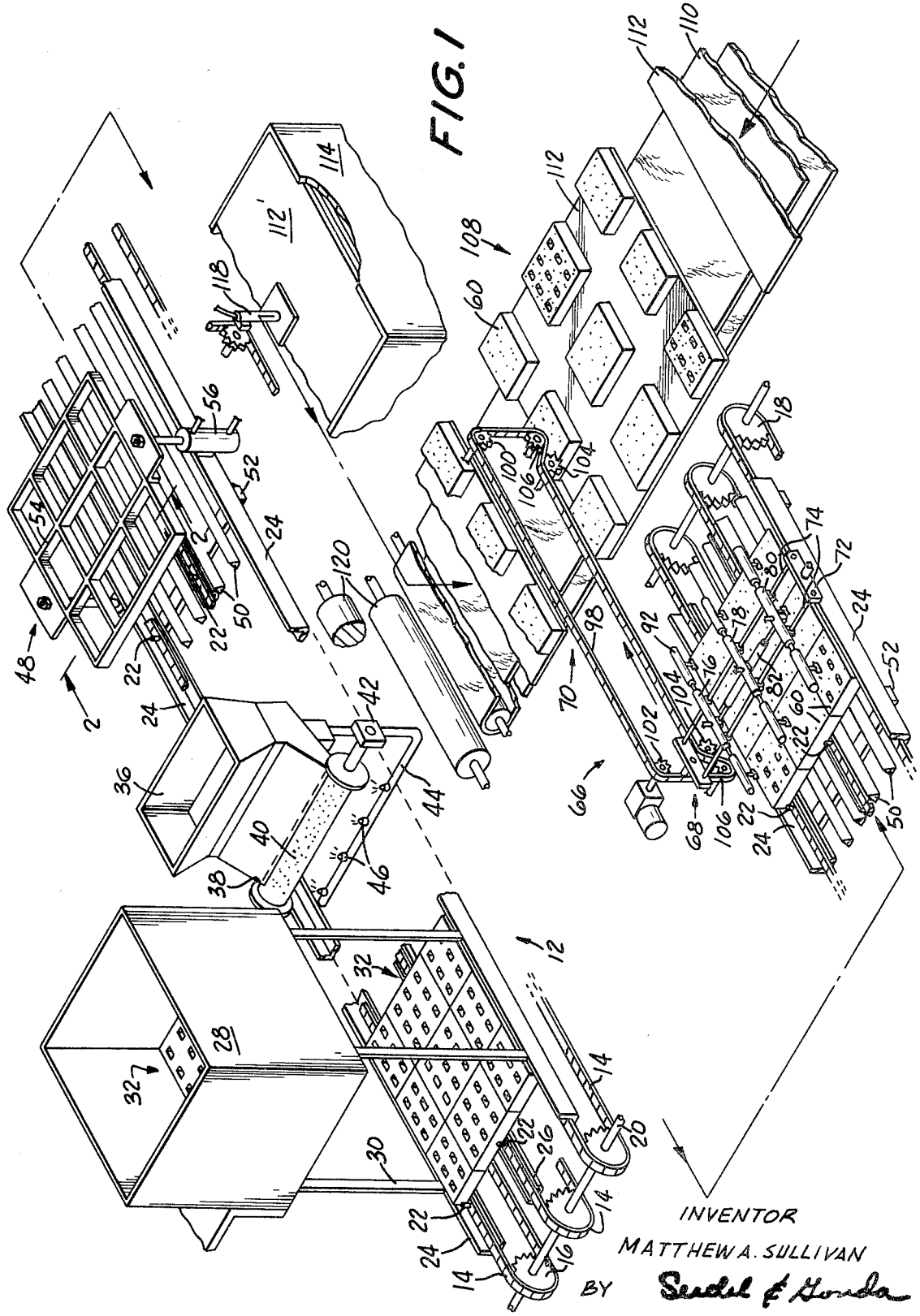

3,513,053
PALLET MAKING APPARATUS AND METHOD
Matthew A. Sullivan, Elkins Park, Pa., assignor to Sullifoam, Inc., Willow Grove, Pa., a corporation of Pennsylvania
Continuation-in-part of application Ser. No. 622,808, Mar. 13, 1967. This application Apr. 29, 1968, Ser. No. 724,952
Int. Cl. B32b 31/18
U.S. Cl. 156—264        10 Claims

ABSTRACT OF THE DISCLOSURE

Apparatus and a method for making pallets of composite construction, with a plastic polymeric core and outer elements of fibrous sheet material such as corrugated board. The apparatus comprises a conveyor, hopper means for feeding the core to the conveyor, means associated with the conveyor for applying adhesive to the core, severing means associated with the conveyor for dividing the core into a plurality of discrete core elements, moving support means for supporting sheet elements and conveying the elements to a location adjacent the conveyor, transport means for engaging the discrete core elements and transporting the elements in predetermined relation to each other to a sheet element on the conveyor, and means associated with the conveyor for transporting another sheet element into vertical juxtaposition with the discrete core elements and the first-mentioned sheet elements and placing the sheet elements over the discrete elements in contact with the respective faces of the discrete elements. The method comprises the steps of providing a core of plastic polymeric material having a plurality of interconnected discrete segments, severing the core to disconnect the segments, applying adhesive to the respective opposite faces of the segments, spacing the segments by a predetermined distance, placing the segments in spaced relation on a sheet element of predetermined dimensions, and placing a second sheet member of predetermined dimensions in contact with opposite faces of the discrete segments.

This application is a continuation-in-part of my co-pending patent application for "Pallet," Ser. No. 622,808, filed Mar. 13, 1967, and now Pat. No. 3,380,403.

This invention relates to a pallet making apparatus and method, and more particularly to an apparatus and method for making expendable pallets of composite construction.

Heretofore, pallets have conventionally been made of wood. Composite pallet constructions of plastic and corrugated board in accordance with the disclosure of my above-identified co-pending application can yield a weight saving of approximately 80% over wood pallets. Also, such composite pallets are capable of rapid and inexpensive manufacture, the savings in unit cost being sufficient to justify economically use of such pallets on an expendable or "throw-away" basis. In the present application, there is set forth an apparatus suitable for manufacturing pallets of composite construction, as well as a method of making such pallets. Such pallets include a core comprising spaced blocks of rigid foam polymeric material, preferably apertured, bonded to a layer of corrugated paperboard or sandwiched between layers. With the present invention, the various raw materials for pallets may be readily assembled at a rapid rate without manual intervention.

With the present process, a series of steps is performed sequentially on the various component parts of the pallet. Thus, a previously fabricated core of plastic polymeric material is provided. The core includes several discrete elements or "blocks," initially rigidly interconnected by webs. The core is initially a unitary element, and may be manipulated as such. For example, adhesive, or a softening agent, may be applied to the core as a unit, prior to separation of the blocks. The webs may be severed in a single operation, and the resultant discrete blocks then separated and properly positioned for disposition on a sheet element. A novel aspect of the present apparatus process is the means whereby the severed discrete elements are simultaneously transported and separated while being transported for deposition on a sheet element.

In view of the foregoing, it is an object of the present invention to provide a method and apparatus for making pallets.

It is another object of this invention to provide a method and apparatus for making pallets of composite construction.

It is still another object to provide a method and apparatus for making pallets wherein pallets may be constructed without substantial manual intervention.

It is a still further object of this invention to provide a means for making pallets of composite construction wherein preassembled component parts are sequentially fed to assembling apparatus, and there assembled in a predetermined manner.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a diagrammatic perspective view showing the method and apparatus of the present invention.

FIG. 2 is a cross-sectional view taken along the line 2—2 in FIG. 1.

FIG. 3 is a top plan view of a portion of the apparatus shown in FIG. 1.

FIG. 4 is a detail view of a portion of the apparatus.

FIG. 5 is a perspective view showing a pallet constructed by the present apparatus and method.

Referring now to the drawings in detail, wherein like numerals indicate like elements, there is seen in FIG. 1 an apparatus designated generally by the reference numeral 10. The apparatus 10 includes a conveyor, designated generally by the reference numeral 12. The conveyor 12 may take the form of spaced endless belts or chains 14 hereinafter referred to for convenience as chains.

The chains 14 are supported at respective ends by sprockets 16, 18. Sprockets 16, 18 may be driven in a conventional manner. For example, sprockets 16 may be disposed on a common shaft 20, driven by a motor, not shown. Chains 14 include upstanding dogs 22 at spaced locations thereon. Angles 24, 26 support the respective chains 14 between the sprockets 16, 18.

A hopper 28 is provided adjacent one end of the conveyor 12. Hopper 28 may be supported by legs 30 or the like coupled to the angles 24. Of course, alternative means may be used for supporting the hopper 28 in a predetermined fixed relation with respect to conveyor 12. Previously molded plastic polymeric cores, designated generally by the reference numeral 32, are retained in hopper 28, and dispensed at predetermined intervals to the conveyor 12. The cores 32 are so dimensioned as to fit between the angles 24. The dogs 22 engage edges of the cores, thereby advancing the cores 32 along conveyor 12.

A dispenser, designated generally by the reference numeral 34 is also placed in such relation with respect to the conveyor 12. Dispenser 34 includes a hopper 36 for retaining an adhesive. "Adhesive," as used hereinafter, is meant to include substances such as glue, as well as suitable solvents capable of rendering surfaces of cores 32 tacky. Dispenser 34, in the illustrated embodiment, includes an outlet 38, disposed in juxtaposition through an applicator roller 40. The applicator roller 40 is journaled in fixed bearings 42. The surface of applicator roller 40 is positioned to contact an upper surface of a core 32 passing along conveyor 12. Thus, applicator roller 40 transfers adhesive from outlet 38 to the upper surface of core 32. A conduit 44 in communication with hopper 36 passes beneath conveyor 12. Conduit 44 includes spray nozzles 46. The spray nozzles 46 directed upwardly, toward the lower face of a core 32 passing thereabove.

Also disposed along conveyor 12 is a severing station, designated generally by the reference numeral 48. Referring to FIGS. 1 and 2, backing strips 50 are provided adjacent severing station 48. In the illustrated embodiment, backing strips 50 are secured to support bars 52 bridging the angles 24. Severing station 48 also includes a cutting frame 54. Actuators 56, disposed on opposite sides of conveyor 12, movably support the cutting frame 54. Actuators 56 may be of the pneumatic or hydraulic type. As is best seen in FIG. 3, frame 54 includes sharpened edges 58 for severing core 32 into discrete elements.

At this point, it would be well to describe a typical core 32 in detail. Core 32 is a flat member, made up in the illustrated embodiment of nine discrete elements or "blocks" 60, interconnected by webs 62. Webs 62 have a thickness substantially less than the overall thickness of blocks 60. As set forth in my above-noted co-pending application, blocks 60 normally include openings 64 extending between respective upper and lower faces thereof.

Application of fluid pressure to actuators 56 is effective to move frame 54 downwardly in FIG. 2, causing edges 58 to sever webs 62. Frame 54 is preferably so configured, as is evident from FIG. 1, that all of the webs 62 on a given core 32 are severed in a single stroke of the actuators 56. Backing strips 50 are so disposed that each of the blocks 60 remains supported thereon after the severing operation. Dogs 22 convey the blocks 60 away from severing station 48.

Referring now to FIGS. 1 and 3, the blocks 60 next approach a lifting and positioning station designated generally by the reference numeral 66. The lifting and positioning station 66 comprises a block lifting head, designated generally by the reference numeral 68, and conveying means, designated generally by the reference numeral 70. The conveying means 70 provide a means whereby lifting head 68 may be positioned for depositing the blocks 60 in proper spaced relation on a sheet element. Referring to FIG. 3, lifting head 68 comprises a carriage 72 having spaced guide rails 74. Actuator cylinders 76, 78, 80 are disposed transversely across the guide rails 74, and are slidable thereon. A further actuator cylinder 82 is disposed in a direction generally parallel to the guide rails 74, and directly mechanically coupled to actuator cylinder 78. Actuator cylinder 82 is of the dual piston type, and has respective oppositely disposed piston rods 84, 86 coupled to the actuator cylinders 76 and 80. It is apparent therefore, that application of actuator fluid to actuator cylinder 82, results in movement of actuator cylinders 76 and 80 along the guide rails 74 in opposite directions for equal distances. Conventional control means, which per se form no part of the present inventive concept, may be provided to ensure equal movement of the piston rods 84 and 86. The actuator cylinders 76, 78 and 80 are also of the double-piston type. Referring to the actuator cylinder 76, whose particular features are typical of all three, oppositely disposed piston rods 88 and 90 carry respective lifting means 92, 94. Lifting means 92 and 94, as is best seen in FIG. 4, include depending fingers 96 adapted for frictional engagement with sides of the openings 64 in blocks 60. Actuator cylinders 76, 78, 80 also support depending fingers 96.

The conveying means 70 comprises an endless belt or chain 98. An upper pass of the endless belt or chain is supported at one end by an idler sprocket 100 and at the other by a drive sprocket 102. The lower pass of the chain 98 is supported at respective ends by spaced idlers 104 and 106. The idlers 104 and 106 are arranged to provide dips in the path of travel of the chain 98 at respective ends. Conventional means, known to those skilled in the art, may be provided to ensure that the guide rails 74 of the carriage 72 remain in a generally horizontal plane, regardless of the position of the links to which the carriage 72 is coupled. Thus, the path of movement of the block lifting head 68 in a vertical plane is defined by the path followed by the endless chain 98. At the idlers 104, 106, the block lifting head 68 reaches the lowest points in its path of travel.

The manner in which the block lifting head 68 serves to lift and position the blocks 60 should now be apparent. Thus, in their normally retracted positions seen in FIG. 1, the actuator cylinders 76, 78, 80, 82 serve to position the fingers 96 in vertical juxtaposition to openings 64 in the blocks 60. The direction of motion of the endless chain 98 is such that the block lifting head 68 descends vertically to its lowest point of travel. As the block lifting head 68 approaches such lowest point of travel, the fingers 96 move into frictional engagement with the openings 64. Continued travel of the block lifting head 68 results in lifting of the respective blocks 60 out of contact with the dogs 22. At this time, application of fluid to the respective actuator cylinders 76, 78, 80, 82 is effective to separate the blocks 60 to positions shown in FIG. 3, corresponding to the relative positions of the blocks 60 in the finished pallet.

Continued movement of the block lifting head 68 with the endless chain 98 brings the blocks 60 to an assembly station designated generally by the reference numeral 108. At the assembly station 108 a conveyor 110, preferably dosposed at right angles to the conveyor 12, provides a feed mechanism for outer pallet elements 112. As explained in my co-pending application, the elements 112 are preferably relatively strong, lightweight sheet material, such as corrugated board. Operation of the conveyor 110 and endless chain 98 is so coordinated that an outer pallet element 112 is positioned beneath the dip in the path of travel of the block lifting head 68 as the lifting head 68 approaches. Provision may be made, of course, for momentary interruption of travel of the conveyor 110 as the block lifting head 68 approaches its low point of travel. As the block lifting head 68 reaches such low point, the already-tacky undersides of the blocks 60 contact the outer pallet element 112 with a slight wiping action. The adhesive force between the outer pallet element 112 and the blocks 60 is sufficient to overcome the frictional force between the fingers 96 and the openings 64 in the blocks 60. Hence, when the block lifting head 68 resumes upward motion after having passed the low point in its travel, the blocks 60 remain on the outer pallet element 112. The conveyor 110 can now be advanced to transport the partially assembled pallet to another location for final assembly.

There is seen in FIG. 1 a bin 114 containing additional outer pallet elements 112′. Transport means 118 are provided for lifting outer pallet elements 112′ from the bin. The outer pallet elements 112′ may then be deposited in contact with the tacky upper surface of the blocks 60. The thus-formed pallet is then passed between spaced pressure rollers 120, which ensure proper contact between the outer pallet elements 112, 112′ and the blocks 60.

Referring to FIG. 5, there is seen a finished pallet manufactured by the present apparatus and method. The illustrated pallet includes spaced blocks 60, disposed between outer pallet elements 112′ and 112.

The sequence of steps performed by the above-described apparatus defines a novel method of pallet construction. The method comprises the steps of providing a core of plastic polymeric material having a plurality of interconnected discrete segments, applying adhesive to respective opposite faces of the core, severing the core to disconnect the segments, spacing the segments by a predetermined distance and placing the segments in spaced relation on a sheet element of predetermined dimensions, and placing a second sheet element of predetermined dimensions in contact with the opposite faces of the discrete segments. Pressure may be applied to the sheet elements to ensure adherence of the sheet elements to the respective opposite faces of the discrete members. Alternatively, the "severing" step may be performed prior to application of the adhesive. Moreover, the step of spacing the segments may be performed while transporting them to the assembly station 108, where the segments are placed on the sheet element.

I claim:

1. Pallet making apparatus comprising a conveyor, feed means adjacent said conveyor for positioning a pre-formed core on said conveyor, dispensing means adjacent said conveyor for applying adhesive to opposite faces of said core, severing means associated with said conveyor for dividing the core into a plurality of discrete blocks, an assembly station adjacent said conveyor, sheet feeding means for supplying the pre-formed sheet elements to said assembly station, transport means engageable with the blocks for transporting the blocks from said conveyor to said assembly station, said transport means including means for spacing the blocks during transport so that the blocks may be placed in spaced relation on a sheet element at said assembly station, and means for transporting a further sheet element to said assembly station so that the further sheet element may be placed on the blocks in vertical juxtaposition with the first-mentioned sheet element at said assembly station.

2. Pallet making apparatus in accordance with claim 1, wherein said assembly station includes spaced pressure applying members for pressing the sheet elements into engagement with the blocks.

3. Pallet making apparatus in accordance with claim 1 wherein said means for dividing the core into a plurality of discrete blocks comprises a frame having severing edges thereon adapted to contact the core at predetermined locations, and support means associated with said conveyor for supporting said blocks during and after contact of said severing edges with said core.

4. Pallet making apparatus in accordance with claim 1 wherein said transport means comprises generally perpendicularly disposed expansible means, and block-engaging members on said expansible means so that expansion of said expansible means is effective to space said blocks.

5. Pallet making apparatus in accordance with claim 1 wherein said transport means comprises a lifting head and means for moving said lifting head from said conveyor to said assembly station, said lifting head comprising generally perpendicularly disposed expansible means operable during movement of said lifting head, expansion of said expansible means being effective to space said blocks.

6. Apparatus in accordance with claim 5 wherein said expansible means comprise fluid-actuated cylinders.

7. Pallet making apparatus in accordance with claim 1 wherein said feed means adjacent said conveyor for positioning a preformed core on said conveyor comprises a hopper disposed above said conveyor for placing a core thereon.

8. A method of making a pallet of composite construction, comprising the steps of providing a core of plastic polymeric material having a plurality of interconnected discrete segments, applying adhesive to respective opposite faces of the core, severing the core to disconnect the segments, spacing the segments by a predetermined distance and placing the segments in spaced relation on a sheet element of predetermined dimensions, placing a sheet element of predetermined dimensions in contact with the opposite faces of the segments, and applying force to the sheet elements to press the sheet elements into contact with the segments.

9. A method of constructing pallets in accordance with claim 8, wherein said step of applying adhesive to respective opposite faces of the core is performed prior to said step of severing the core to disconnect the segments.

10. A method of constructing pallets in accordance with claim 8, comprising the further step of transporting the segments to an assembly station at which said step of placing the segments in spaced relation on a sheet element is performed, said transporting step being performed simultaneosuly with said step of spacing the segments by a predetermined distance.

References Cited

UNITED STATES PATENTS

| | | | |
|---|---|---|---|
| 2,744,046 | 5/1956 | Ware et al. | 156—552 X |
| 2,991,214 | 7/1961 | Burkholder | 156—522 X |
| 3,118,804 | 1/1964 | Tibbals | 156—552 |
| 3,376,185 | 4/1968 | Shook et al. | 156—562 X |

VERLIN R. PENDEGRASS, Primary Examiner

U.S. Cl. X.R.

156—300, 517, 552, 562